(12) United States Patent
Jackson (10) Patent No.: US 7,341,017 B2
(45) Date of Patent: Mar. 11, 2008

(54) HYDRAULICALLY LOCKED BOAT ACCESSORY MOUNTING DEVICE

(75) Inventor: John R. Jackson, Knoxville, TN (US)

(73) Assignee: J&J Machine & Tool, Inc., Knoxville, TN (US)

( * ) Notice: Subject to any disclaimer, the term of this patent is extended or adjusted under 35 U.S.C. 154(b) by 0 days.

(21) Appl. No.: 11/422,717

(22) Filed: Jun. 7, 2006

(65) Prior Publication Data

US 2007/0283873 A1    Dec. 13, 2007

(51) Int. Cl.
*B63B 17/00* (2006.01)

(52) U.S. Cl. .................. 114/343; 114/364; 403/31; 403/90; 403/91

(58) Field of Classification Search .............. None
See application file for complete search history.

(56) References Cited

U.S. PATENT DOCUMENTS

| | | | |
|---|---|---|---|
| 2,354,937 A * | 8/1944 | Barker | 269/75 |
| 3,737,130 A * | 6/1973 | Shiraishi | 248/181.1 |
| 3,910,538 A | 10/1975 | Baitella | |
| 3,986,692 A | 10/1976 | Kinoshita | |
| 4,491,435 A | 1/1985 | Meier | |
| 4,886,230 A | 12/1989 | Jones | |
| 5,092,551 A | 3/1992 | Meier | |
| 5,125,776 A * | 6/1992 | Muller et al. | 409/234 |
| 5,919,067 A * | 7/1999 | Smith | 440/2 |
| 6,491,273 B2 | 12/2002 | King | |
| 6,575,653 B1 | 6/2003 | Krauter | |
| 6,641,323 B2 | 11/2003 | Ronsheim | |
| 6,896,231 B1 | 5/2005 | Sullivan, Sr. | |

\* cited by examiner

*Primary Examiner*—Sherman Basinger
(74) *Attorney, Agent, or Firm*—Knox Patents; Thomas A. Kulaga (57) ABSTRACT

An apparatus for a hydraulically locked accessory mounting device for attaching accessories to a boat, or vessel. The mounting device includes a base for attaching to the boat and a ball head that is attached to an accessory, which can be moved to a selected position and locked in that position by a hydraulic assembly. The hydraulic assembly includes a first piston moved by an operator. The first piston is in hydraulic communication with a second piston, which engages a shoe that locks the ball in position. In one embodiment, the hydraulic system includes a bleed valve connected to the channel between the first and second pistons. In one embodiment, the first piston is operated by a knob with a threaded shaft. In another embodiment, the first piston is operated by a cam on a shaft that is rotated with a lever or knob.

19 Claims, 6 Drawing Sheets

HYDRAULICALLY LOCKED BOAT ACCESSORY MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an accessory mounting device with a hydraulic locking assembly. More particularly, this invention pertains to a device for attaching a boat accessory, such as a light, speaker, rack, or mirror, to a rail or other member of a boat or other vessel. The attaching device has a ball joint that is locked in place with a hydraulic locking assembly.

2. Description of the Related Art

Marine vessels require various accessories in order to serve the needs of the vessel operators. For example, sport boats, which are one type of marine vessel, are often used to tow water skiers and/or wakeboarders. These boats require a mirror to allow the operator to view the person being towed while operating the boat. It is also often desired to outfit these boats with speakers, lights, and racks for carrying various items such as wakeboards, skis, and personal floatation devices. These accessories are attached to the boat and often require positional adjustment.

A boat operates in a marine environment and is subject to salt and/or fresh water. The external accessories are also exposed to sun, rain, wind, and other outdoor environmental conditions. Accordingly, the accessories and their attachment to the boat must be suitable for an outdoor marine environment and be able to withstand the rigors of outdoor exposure. Minimizing the number of moving parts is advantageous for devices exposed to extreme environments, such as that found on or near boats.

Additionally, boats are subject to vibration. Many sport boats are small with a large internal combustion engine. Not only is the boat, and its accessories, exposed to the vibration from the engine as it runs at various speeds and power levels, but the boat is also subject to vibration, shocks, and impacts as it moves through and/or over the water at various speeds. These loads require that the accessories be mounted in a manner that provides sufficient support to withstand the dynamic loads the accessories are subject to during use of the boat. Because of the mass and weight of some boat accessories, accessory mounts need to have the strength to withstand the dynamic loads during boat operation.

It is known to attach accessories to boats by using mechanical clamps with fasteners to secure the accessory to the boat. Oftentimes, to achieve the necessary strength and rigidity of the attachment, tools are required to loosen the clamp in order to move the accessory to a desired position. Unfortunately, when working with fasteners and tools, the fasteners and/or tools are often dropped. On a boat, which is normally floating on water, dropping a fastener or tool results in a loss of that fastener or tool if it ends up in the water. Accordingly, there are advantages to attaching an accessory to a boat without requiring tools and without having any loose parts. It is desirable for the attaching device to be self-contained and be hand operated to achieve positional adjustment of the accessory.

Various jointed stands are known in the art. For example, U.S. Pat. No. 3,910,538, titled "Jointed stand for dial gages," discloses a pair of lockable balls at opposite ends of a swiveling arm assembly. A knob in the arm assembly actuates a mechanical linkage assembly that locks each ball in a clamp. U.S. Pat. No. 4,491,435, titled "Jointed stand," discloses a variation of the device disclosed in the '538 patent. This patent uses mechanical means to lock the ball heads.

U.S. Pat. No. 3,737,130, titled "Hydraulically operated tripod head," discloses a camera tripod head with a head body and a hydraulic mechanism. A compression spring 33 forces a ball rest member 23 against the ball 13 so that the ball 13 is clamped in position. Operating the hydraulic plunger 27 to increase the hydraulic pressure lifts the cylinder block 24 and compresses the compression spring 33, thereby not subjecting the ball rest member 23 to the force of the spring 33 and allow the ball 13 to move freely.

Other articulated support devices are known in the art. For example, U.S. Pat. No. 6,491,273, titled "Releasable lockable re-positionable arm-like support apparatus," requires a pressurized reservoir 28 to supply hydraulic force to lock the support in position. U.S. Pat. No. 6,641,323, titled "Spherical locking device," discloses a manually operated pump assembly 30 to provide the hydraulic force to lock the ball 11 in place. Many of the prior art devices do not exhibit sufficient strength to support heavy marine accessories and/or are not self-contained.

U.S. Pat. No. 6,854,413, titled "Boat tower hinge and footer assembly," discloses an accessory (a boat tower 114) that is hingedly attached to a boat 102. The tower 114 has a releasable connection 118 at one end and a hinge 110 at the other. Also, one end of the tower 114 is supported by a footer 122, 124, 126. This patent illustrates one type of accessory and its support and attachment mechanisms.

BRIEF SUMMARY OF THE INVENTION

A hydraulically locked accessory mounting device is provided. According to one embodiment of the present invention, the mounting device includes a clamp for attaching the device to a boat tower or stanchion. In other embodiments, the mounting device attaches to the boat or vessel by way of a mounting plate or other attachment. The mounting device also includes a ball head with a bolt or other attachment member extending from the ball and connected to an accessory. The accessory includes items found on a boat or vessel and includes, but is not limited to, lights, speakers, mirrors, racks, and personal floatation device carriers. Between the mounting bracket and the ball is a hydraulic locking assembly, which includes a first piston actuated by a handle, a hydraulic channel connecting the first piston to a second piston, which engages a shoe that locks the ball in ball head.

In one embodiment, the first piston is operated upon by a knob with a threaded end. The threaded end moves linearly when the knob is rotated, thereby causing the first piston to move linearly. In another embodiment, the first piston is operated by a cam that is rotated by a lever. The cam has a lobe that causes the first piston to move linearly as the cam is rotated by the lever. In one embodiment, the first piston includes a cooperating spring that is positioned between the first piston and the operator. In another embodiment, a spring is adjacent the second piston.

In various embodiments, the first and second pistons include an o-ring and/or a wiper positioned around the circumference of the piston. In one embodiment, the device includes an external connection for the introduction of hydraulic fluid into the device and for bleeding air from the channel.

The accessory mounting device allows accessories to be attached to a boat in a desired, selected position or orientation. Because a boat is operated upon water, it is desirable to have equipment that is captive or otherwise has no removable parts, which are susceptible to being dropped overboard. It is also desirable to minimize the use of tools, which can be dropped overboard. The hydraulic locking assembly allows for easy repositioning of accessories without removing any parts or using any tools.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for a hydraulically locked accessory mounting device is disclosed. Boat owners and operators oftentimes wish to mount accessories onto their vessels. These accessories often require positioning to achieve proper or optimum functionality. Further, it is desirable to position such accessories without removing equipment or parts and without using tools. Boat accessories include many items that are attached to a boat 102, including speakers, mirrors, towers, lights, and racks for wakeboards, skies, life preservers, and/or personal floatation devices.

Figure 1:
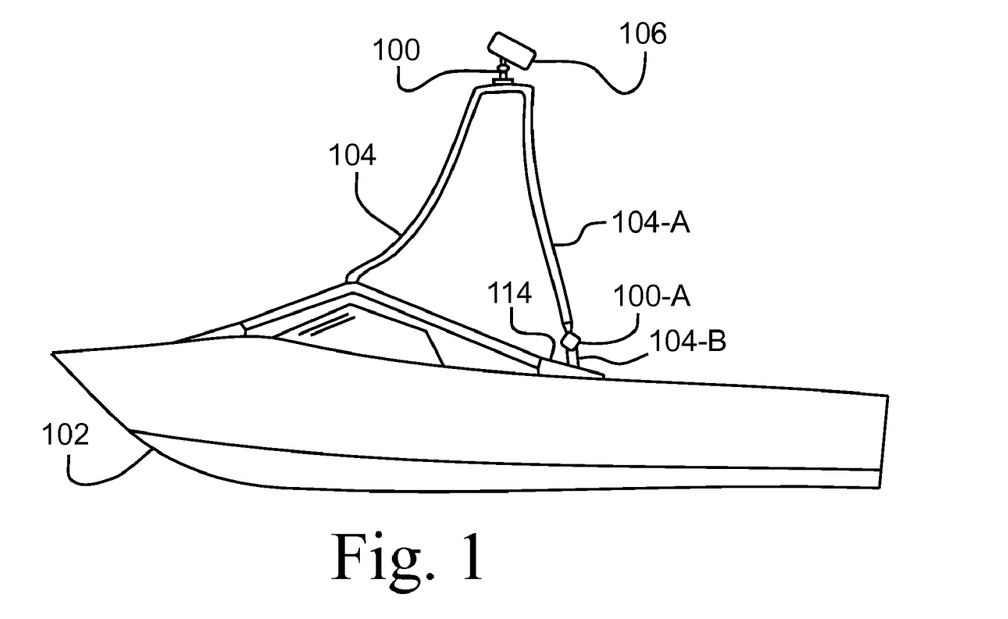
FIG. 1 is a side view of a vessel showing an accessory mounting device attached to a tower and supporting a speaker.

FIG. 1 illustrates a side view of a vessel 102 showing an accessory mounting device 100 attached to a tower 104 and supporting a speaker 106. The speaker 106 is illustrated with its aft, or rearward facing, end aimed downward toward the aft cockpit of the boat 102. Such positioning is oftentimes a matter of preference of the boat operator in order to obtain optimum functionality of the accessory, which in the illustration is a speaker 106. Once the accessory 106 is in a desired position, the accessory 106 must remain in that position until it is desired to move it to a different position.

The illustrated boat 102 is a single hulled pleasure/sport craft with a tower 104 such as used to pull a skier or wakeboarder. Those skilled in the art will recognize that other watercraft than the illustrated type have a need for one or more accessory mounting devices 100.

Figure 2:
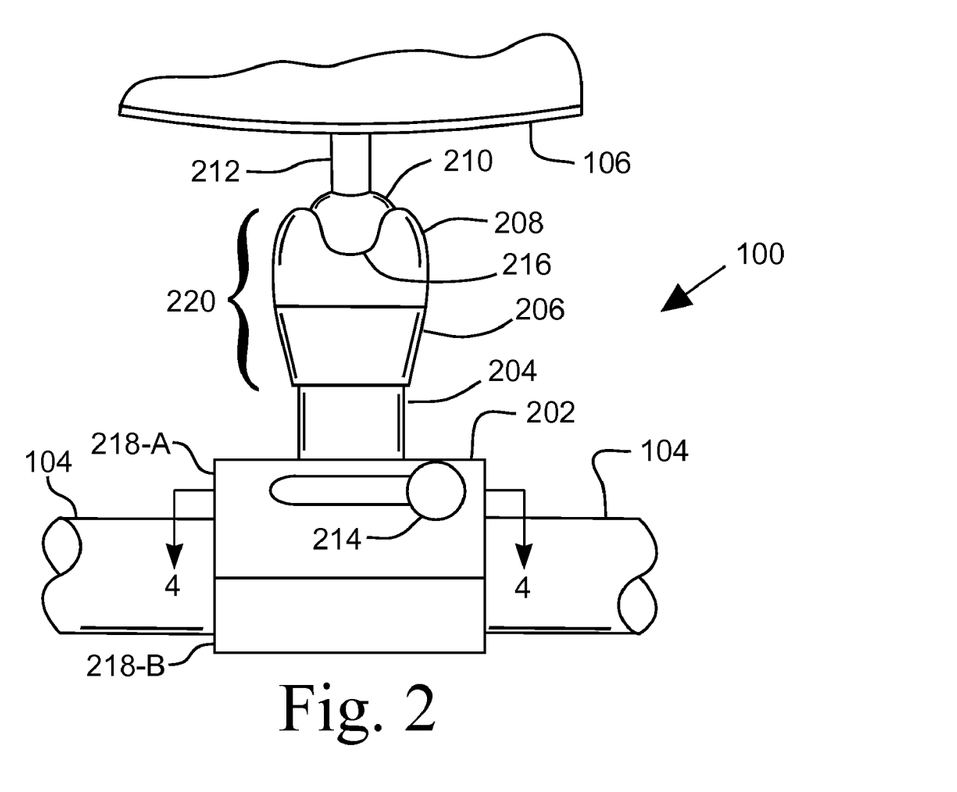
FIG. 2 is a front view of one embodiment of the accessory mounting device.

FIG. 2 illustrates a front view of one embodiment of the accessory mounting device 100. The mounting device 100 includes a base 202 for attaching the accessory mounting device 100 to a structure, which in the illustrated embodiment is a tubular member of the boat tower 104. The base 202 has two members 218-A, 218-B that form a clamp that secures the accessory mounting device 100 to a tubular member 104 of the boat tower 104. The lower member 218-B includes a plurality of through-openings that butt with threaded openings in the upper member 218-A. The base 202 is clamped to the tower 104 by threaded fasteners inserted in the through-openings in the lower member 218-B and engaging the threaded openings in the upper member 218-A.

Protruding from the base 202 is a lever operator handle 214, which is illustrated in the ball head locked position. The lever operator handle 214 is locked in the illustrated position, that is, with the lever 214 substantially parallel to the longitudinal axis of the tower member 104. The unlocked position is achieved by rotating the lever handle 214 such that it is substantially perpendicular to the longitudinal axis of the tower member 104.

Extending above the base 202 is a cylindrical, or support, member 204 with a ball socket 220 that includes a ball head base 206 and a ball head cap 208. The ball head base 206 and the ball head cap 208 form a ball socket 220 in which a ball 210 is held captive. The ball socket 220 rotates around the longitudinal axis of the cylindrical member 204 when the ball 210 is not locked in the ball socket 220. In the unlocked condition, the ball socket 220 rotates to allow the head slot 216 to be positioned so that the ball stud 212 is able to be positioned with an included angle between the axis of the cylindrical member 204 and the axis of the ball stud 212 that approaches a right angle and with the ball stud 212 pointing in a desired direction. In one embodiment, a pair of slots 216 are positioned on opposite sides of the ball head cap 208. In another embodiment, a single slot 216 is positioned on the ball head cap 208.

In the illustrated embodiment, the ball stud 212 is attached to the bottom of the accessory 106. Those skilled in the art will recognize that the attachment of the ball stud 212 to the accessory 106 can be by a threaded opening in the accessory 106 engaged by a threaded stud 212, by a mounting plate fixed to the end of the stud 212 and attached to the accessory 106, by welding the stud 212 to the accessory 106, or by other attachment methods without departing from the spirit and scope of the present invention.

Figure 3:
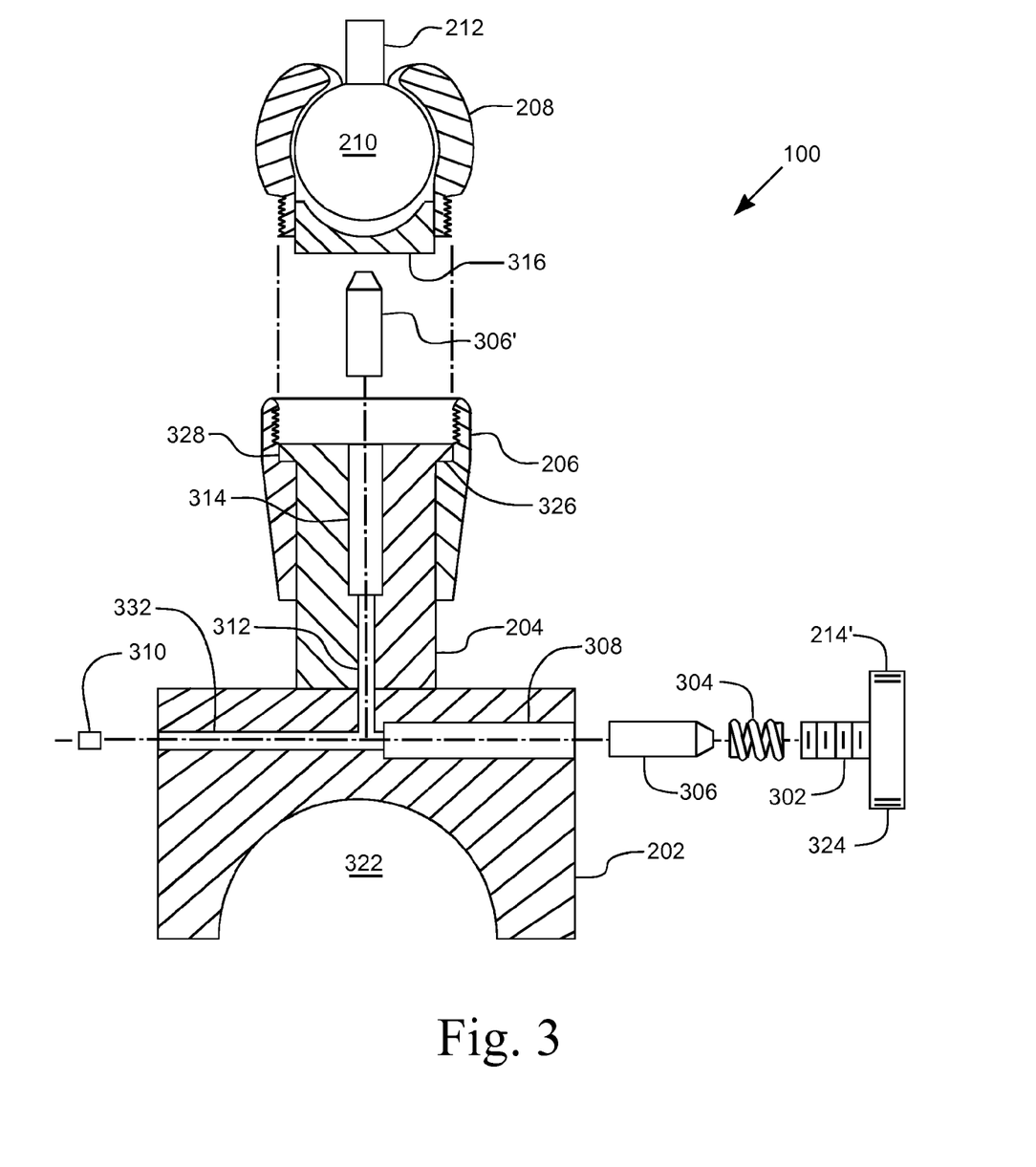
FIG. 3 is an exploded cross-sectional diagram of another embodiment of the accessory mounting device.

FIG. 3 illustrates an exploded cross-sectional diagram of another embodiment of the accessory mounting device 100 in which the operator handle 214' is a knob 324 with a threaded shaft 302 that engages a partially threaded opening 308 in the base 202. The threaded shaft 302 of the knob 324 engages one end of a spring 304 that slides within the opening 308. The other end of the spring 304 engages a first piston 306 that slides within a portion of the opening 308 that has a smooth bore, that is, the portion of the opening 308 that is not threaded to engage the threaded shaft 302. When the knob 324 is rotated, the threaded shaft 302 moves linearly in the longitudinal direction of the opening 308, thereby causing the piston to also move linearly in the longitudinal direction.

A channel 312 connects the first opening 308 with a second opening 314 through which slides a second piston 306'. The channel 312 contains a hydraulic fluid that operatively connects the first piston 306 to the second piston 306'.

The outboard end of the second piston 306' engages a shoe 316 that presses against the ball 210, thereby locking the ball 210 in the ball head cap 206 when the first piston 306 is moved into the first opening 308. In one embodiment, the shoe 316 has one end that is engaged by the second piston 306' and an opposite end with a spherical cavity that engages the ball 210.

Those skilled in the art will recognize that the spring 304 can be positioned adjacent either the first piston 306 or the second piston 306' without departing from the spirit and scope of the present invention. In one embodiment, the spring 304 is not used and the threaded shaft 302 of the operator handle 314' includes an end opposite the knob 324 that is not threaded and has a smaller diameter than the threaded portion of the shaft 302 such that the non-threaded end of the shaft 324 slides within the opening 308 and engages the end 502 of the piston 306.

The ball head base 206 slideably engages the cylindrical member 204. An inside ledge 326 in the ball head base 206 engages a flange 328 on the top of the cylindrical member 204. Adjacent the inside ledge 326 in the ball head base 206 is a female thread that engages a male thread on the ball head cap 208, thereby connecting the ball head base 206 to the cap 208. With the cap 208 connected to the base 206 and the second piston 306' not engaging the shoe 316, there is clearance between the inside ledge 326, the flange 328, the shoe 316, and the ball 210 such that the ball socket 220 rotates about the longitudinal axis of the cylindrical member 204 and the ball freely moves within the cavity of the ball socket 208. Movement of the second piston 306' in the second opening 314 towards the shoe 316 pushes the shoe 316 toward the ball 210, which lifts the ball socket 220 until the inside ledge 326 makes firm contact with the flange 328 of the cylindrical member 204, thereby forming a rigid connection between the cylindrical member 204 and the ball 210.

The clamp base 202 includes a first member and a second member that are connected to surround a tower member 104. Illustrated in FIG. 3 is the first member of the clamp base 202 showing a semi-circular opening 304 for receiving the tower member 104. The first member of the clamp base 202 has sufficient thickness between its outside surfaces and the surfaces of the first opening 308 and the channel 312 such that the material of the clamp base 202 contains the fluid pressure created when moving the operator 214 to the locked position.

Illustrated in FIG. 3 is a second channel 332 with a plug 310 for sealing the end of the second channel 332. The second channel 332 and corresponding plug 310 allow for the introduction of hydraulic fluid into the first channel 312 and to also bleed any air out of the first channel 312 and the two cylindrical openings 308, 314. In one embodiment, the first channel 314 and the volumes of the openings 308, 314 between the pistons 306, 306' are completely filled with hydraulic fluid. In this embodiment, linear movement of the first piston 306 is directly translated into a corresponding movement of the second piston 306'. In another embodiment, a small amount of air or other compressible gas is introduced into the volume of the first channel 312 and the openings 308, 314. When the operator handle 214 is moved in the locked position, the air is compressed until sufficient pressure exists to move the second piston 306' and fully lock the ball 210 in the selected position. The compressed air acts as a spring member to maintain a relatively constant pressure against the second piston 306' regardless of temperature variations or any relaxing of the mechanical components.

In an embodiment with the spring 304 between the first piston 306 and the operator shaft 302, resilience is introduced into the system allowing spring pressure to act on the first piston 306 and thereby maintaining a relatively constant hydraulic pressure within the device 100 regardless of temperature variations or any relaxing of the mechanical components. In the embodiment without the spring 304, minimal rotation of the operator handle 214' is needed to move between the fully locked and the fully unlocked position.

Figure 4A:
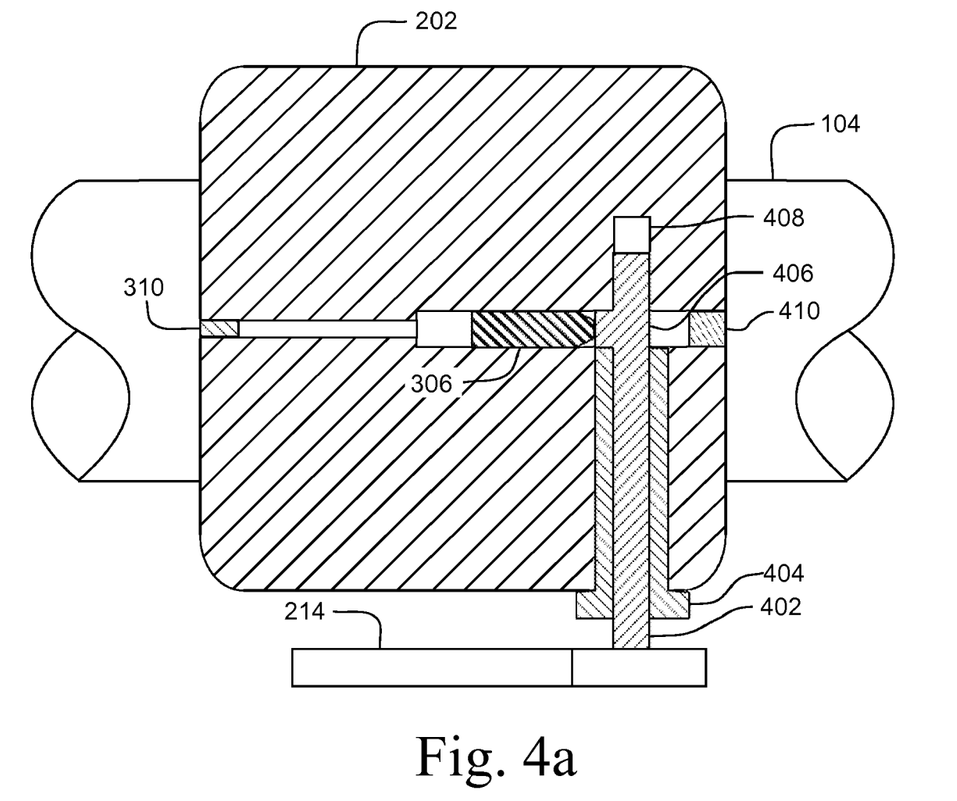
FIG. 4a is a cross-sectional top view of the first piston and a lever operator.
Figure 4B:
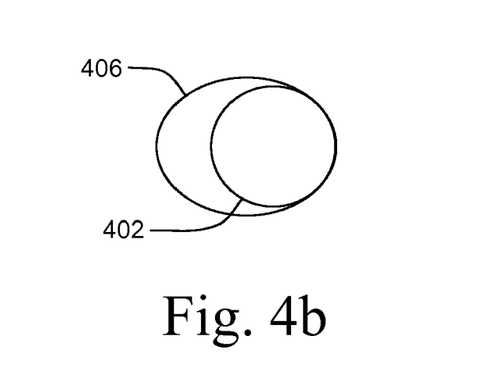
FIG. 4b is an end view of one embodiment of a lever operator shaft.

FIG. 4a illustrates a cross-sectional top view of the base 202 showing the first piston 306 and a lever operator 214. FIG. 4b illustrates an end view of one embodiment of a lever operator shaft 402. In the embodiment illustrated in FIGS. 4a and 4b, the portion of the accessory mounting device 100 above the base 202 is as described elsewhere. The outboard end of the threaded opening 308 has a threaded plug 410. The plug 410 seals the first opening 308, preventing the intrusion of dirt and dust into the opening 308. Perpendicular to the longitudinal axis of the first opening 308 is an operator opening 408, which receives an operator shaft 402 and a threaded bushing 404. The operator opening 408 is threaded near the open end of the opening 408 and receives the threaded bushing 404. The threaded bushing 404 has a smooth bore through which the operator shaft 402 slideably rotates. The operator shaft 402 includes a cam 406 that is positioned adjacent the first piston 306. The operator opening 408 is sized to receive the major diameter of the cam 406. The lever handle 214 attaches to the outboard end of the operator shaft 402 and is fixed to the shaft 402 such that rotation of the lever handle 214 is translated into a corresponding rotation of the cam 406 on the operator shaft 402.

To assemble the embodiment of the accessory mounting device 100 illustrated in FIGS. 4a and 4b, the piston 306 is inserted into the first cylindrical opening 308 and the operator shaft 402 is inserted into the operator opening 408 until the cam 406 is adjacent the piston 306. The threaded bushing 404 is threaded into the base 202, seating against the side of the cam 406 and thereby securing the operator shaft 402 inside the base 202. The lever handle 214 is attached to the operator shaft 402 and the plug 410 is inserted.

Figure 5:
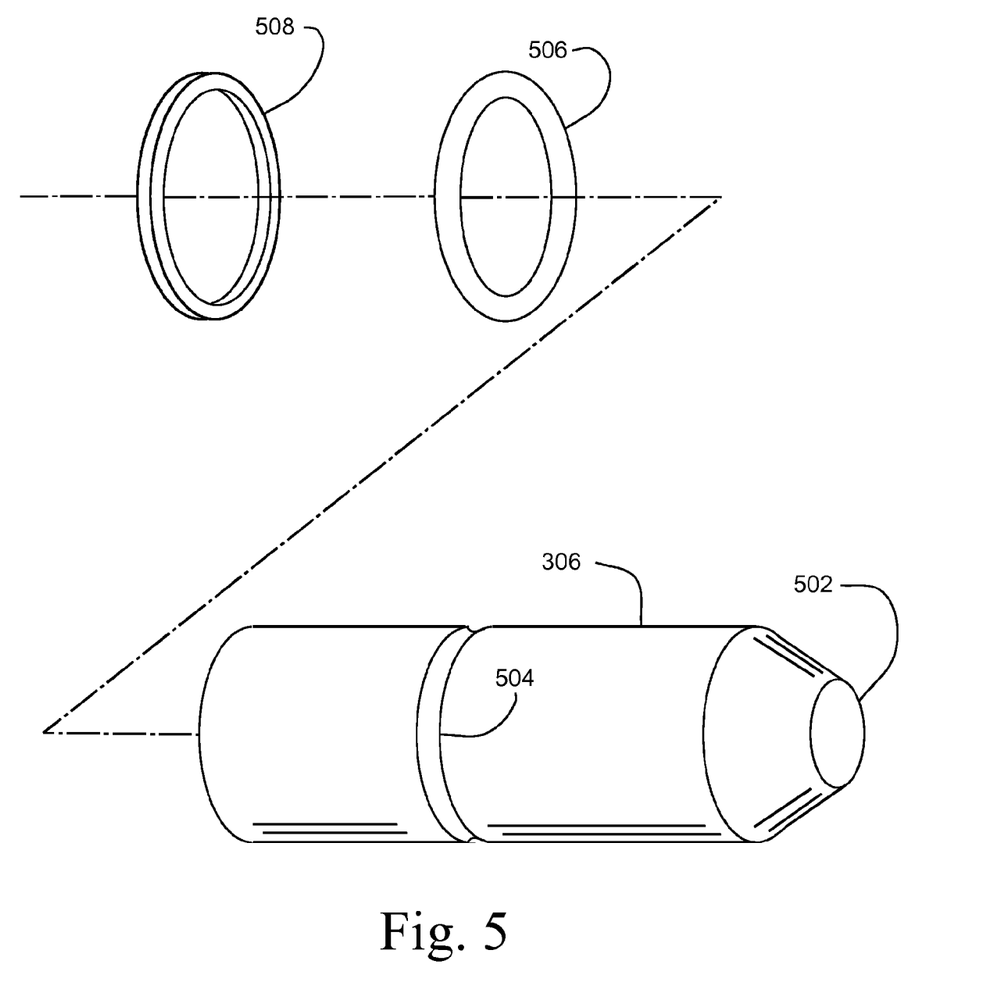
FIG. 5 is an exploded view of one embodiment of a piston assembly.

FIG. 5 illustrates an exploded view of one embodiment of a piston 306 with an o-ring 506 and ring 508. The piston 306 has a first end 502 that connects to the cylindrical body of the piston 306 with a beveled surface. In the cylindrical body of the piston 306 is a semicircular groove 504 adapted to receive an o-ring 506. In one embodiment the o-ring 506 is a resilient material that deforms when the piston 306 is in the cylindrical opening 308, 314 such that a liquid seal is formed by the o-ring 506 between the inside surface of the cylindrical opening 308, 314 and the piston 306.

In one embodiment, a ring 508 slides over the cylindrical body of the piston 306 adjacent the o-ring 506. The inside diameter of the ring 508 is substantially the same as, or slightly larger than, the outside diameter of the piston 306, and the outside diameter of the ring 508 is substantially the same as, or slightly smaller than, the inside diameter of the cylindrical opening 308, 314. The ring 508 centers the piston 306 in the cylindrical opening 308, 314 and prevents the o-ring 506 from being compressed, or deformed, asymmetrically.

Figure 6:
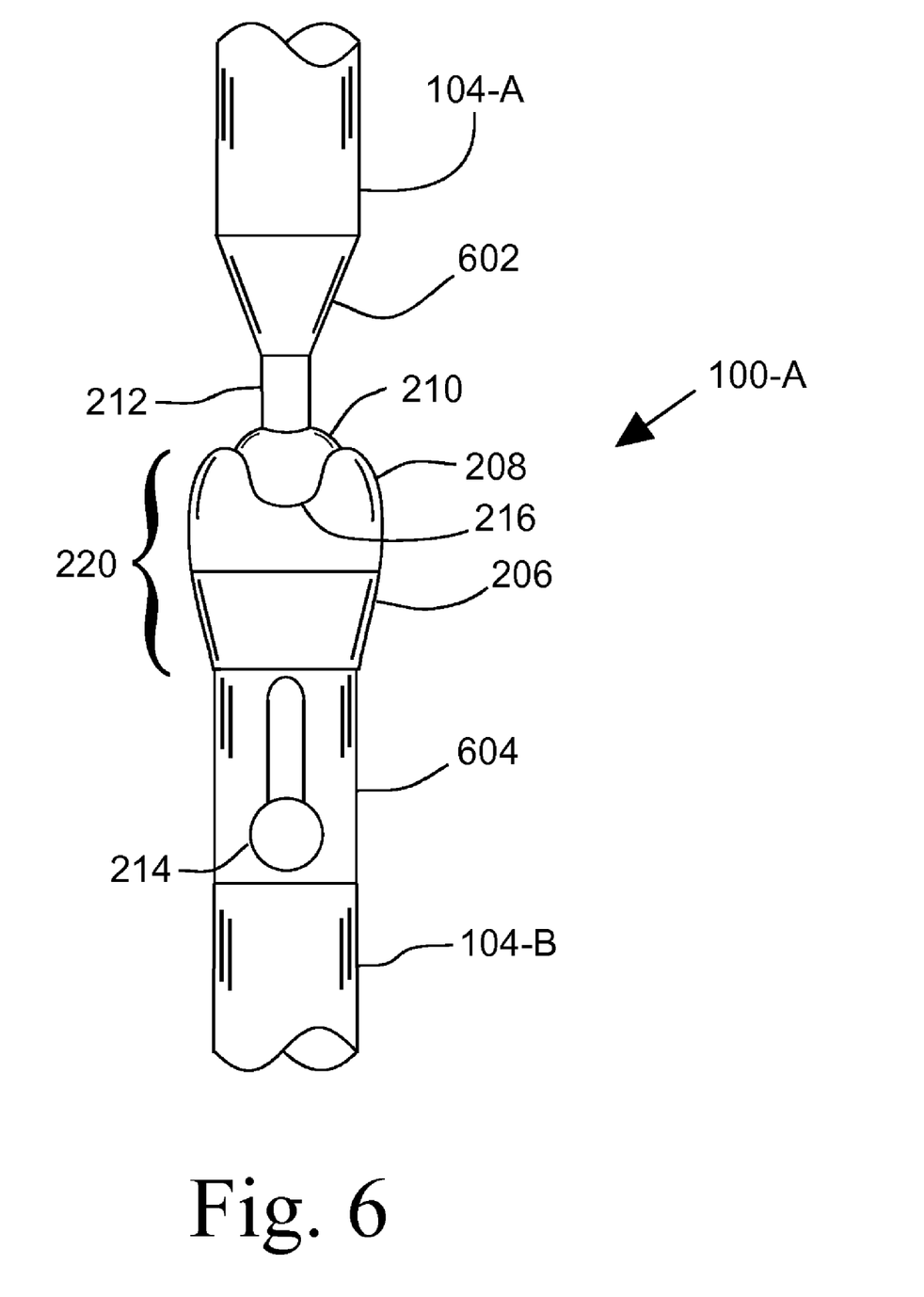
FIG. 6 is a partial front view of another embodiment of the accessory mounting device.

FIG. 6 illustrates a partial front view of another embodiment of the accessory mounting device 100-A in which the device 100-A is attached in-line in the tower 104 between two tower sections 104-A, 104-B. In this embodiment, the device 100-A, mounts a portion of a tower 104 and acts as a hinge. The tower 104 is releasably attached to the boat 102 away from the device 100-A such that when the tower 104 is released and the device 104-A is in the unlocked position, the tower 104 pivots around the ball 210. Because the tower 104 typically includes four leg sections, when two devices 100-A are positioned on adjacent leg sections the tower 104 will tilt as it pivots about the ball 210.

The base 604 is adapted to mate with one section of the tower 104 tubing 104-B. The stud 212 atop the ball 210 mates with a conical-shaped adapter 602 adapted to mate with another section of the tower 104 tubing 104-A. The handle 214 has two positions: locked and unlocked. With the handle 214 in the locked position, the ball 210 is securely held in the socket 220 without any rattling or looseness in the connection between the two tubing sections 104-A, 104-B. With the handle 214 in the unlocked position, the ball 210 is free to move in the socket 220, and the tower 104, if released at the opposite end of the tower 104 from the device 100-A, is free to tilt or be lowered. With the handle 214 in the unlocked position, the accessory mounting device 100-A is a hinge.

In still another embodiment, the base 202, 604 is incorporated into a footer 114 that attaches to the boat 102 and supports at least one leg of the tower 104. Illustrated in FIG. 1, the footer 114 supports two legs of the tower 104. In this embodiment, the handle 214 protrudes from the footer 114 and the handle 214 is operatively connected to the first piston 306 in a similar manner as the illustrated in the base 202 that clamps to the tower 104.

Figure 7:
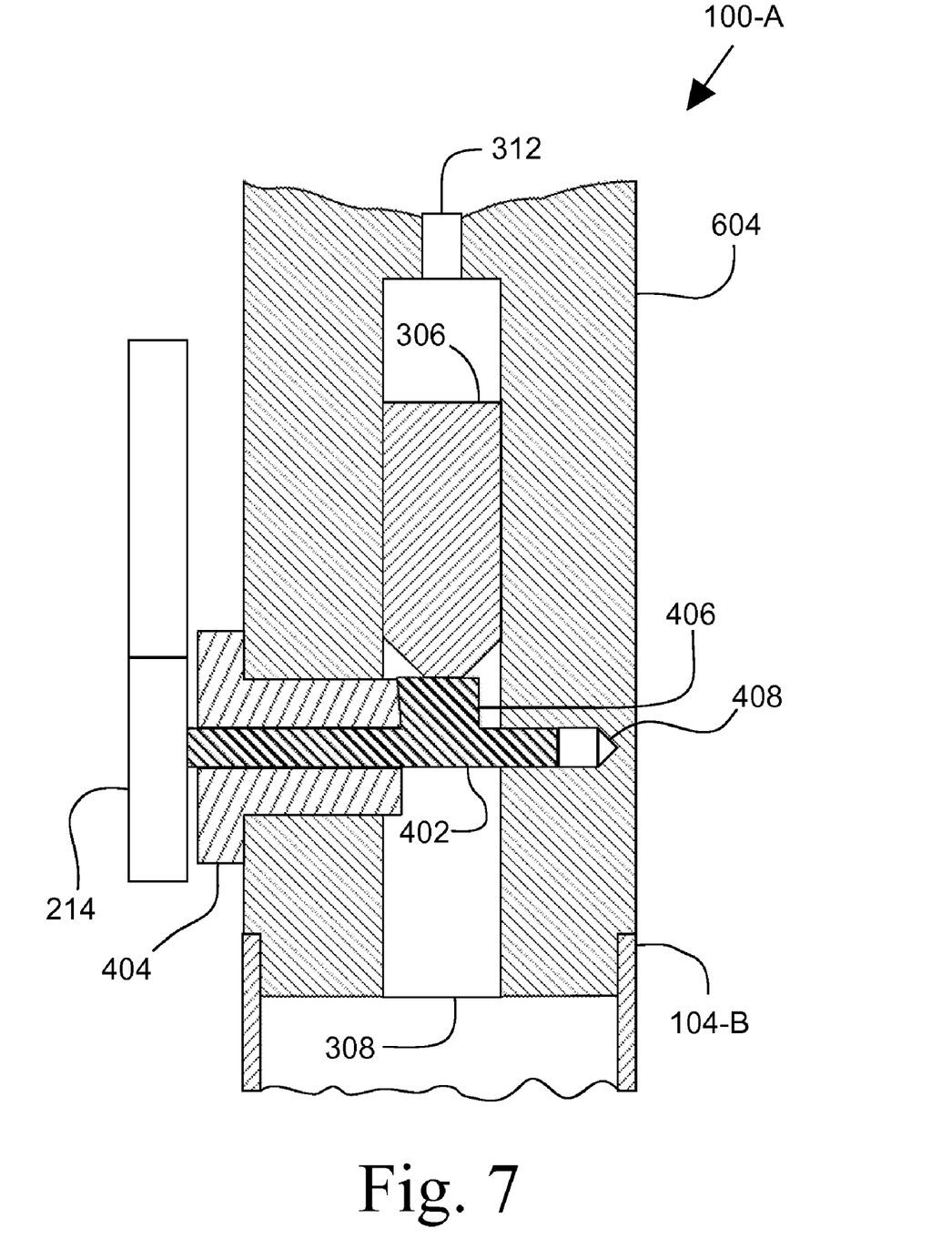
FIG. 7 is a partial cross-sectional view of the embodiment illustrated in FIG. 6.

FIG. 7 illustrates a partial cross-sectional view of the embodiment of the accessory mounting device 100A illustrated in FIG. 6. The first cylindrical opening 308 is aligned with the longitudinal axis of the base 604. The piston 306 is positioned in the cylindrical opening 308 and is engaged by the cam 406 on the operator shaft 402 attached to the handle 214. The shaft 402 is held in place in the shaft opening 408 with a bushing 404. The cam 404 rotates in cooperation with the handle 214, causing the piston 306 to move linearly within the cylindrical opening 308. That linear movement causes the second piston 306 (not illustrated in FIG. 7) to move cooperatively and lock and unlock the ball 210 in the socket 220. Visible in FIG. 7 is the lap joint of the base 604 to the tower tubing section 104-B. In the illustrated embodiment, the base 604 performs the functions of the base 202 and the support member 204 for the clamping accessory mounting device 100 embodiment. That is, the illustrated embodiment of the accessory mounting device 100-A, the support member 204 of the device 100 illustrated in FIGS. 2 and 3 is integral with the base 604 illustrated in FIGS. 6 and 7.

An advantage of the accessory mounting device 100, 100-A is that the device 100, 100-A, with the ball 210 in the locked position, forms a solid joint without rattling, even when subjected to vibration and impact loading as experienced on boats 102 and other vessels. A further advantage of the device 100, 100-A is that the device 100, 100-A is operated by a handle 214, 214' without requiring tools or removing any parts from the device 100, 100-A.

The accessory mounting device 100 includes various functions. One such function is placing the ball 210 in a locked position, which is implemented, in one embodiment, by the handle 214' moving the first piston 306, which causes the second piston 306' to move correspondingly and force the shoe 316 against the ball 210, thereby lifting the socket 220 relative to the support member 204 and restraining the ball 210 from moving within the socket 220. In another embodiment, the handle 214 is connected to an operator shaft 402 that has a cam 406 with a lobe that causes the first piston 306 to move linearly.

From the foregoing description, it will be recognized by those skilled in the art that a hydraulically operated accessory mounting device has been provided. While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An accessory mounting apparatus for releaseably locking a boat accessory in a selected position, said apparatus comprising:
    a base for attaching to a boat, said base adapted to attach to a member on the boat;
    a ball head assembly having a ball held captive in a socket, said ball having a locked position and an unlocked position, said ball movable within said socket when said ball is in said unlocked position, said ball held in a fixed position when said ball is in said locked position, said socket having an opening through which a stud member extends from said ball, said stud member adapted to attach to an accessory;
    a support member connecting said ball head assembly to said base, said socket rotating about a longitudinal axis of said support member when said ball is in said unlocked position, said socket including a base member attached to a cap member, said base member having an inside ledge cooperating with a flange extending from said support member, said base member being restrained from sliding off said support member by said flange; and
    a handle protruding from said base, said handle having a first position and a second position, said ball being in said locked position when said handle is in said first position, said ball being in said unlocked position when said handle is in said second position, said handle causing a first piston to move linearly within a first cylindrical opening in said base, said first piston hydraulically connected to a second piston moveable linearly within a second cylindrical opening in said support member, said second piston engaging a shoe adjacent said ball in said socket, said shoe pressing against said ball in said locked position;
    a spring disposed adjacent one of said first piston and said second piston, said spring being outside a hydraulic channel hydraulically connecting said first piston and said second piston, said spring configured to apply a pressure against said one of said first piston and said second piston to maintain a substantially constant hydraulic pressure over an ambient temperature range.

2. The apparatus of claim 1 wherein said stud member is attached to one item selected from a group including a speaker, a light, a mirror, and a tower member.

3. The apparatus of claim 1 wherein said first piston includes a cooperating o-ring engaging a circumferential groove in a cylindrical body of said first piston and said second piston includes a cooperating o-ring engaging a circumferential groove in a cylindrical body of said second piston.

4. The apparatus of claim 1 wherein said socket includes a slot extending from said opening in said slot, said slot sized to receive said stud member.

5. The apparatus of claim 1 wherein said handle is attached to a threaded shaft, said threaded shaft engaging a threaded portion of said first cylindrical opening, said threaded shaft causing said first piston to move linearly as said handle is rotated.

6. The apparatus of claim 1 wherein said base is a clamp for a tubular member, said clamp including a through-opening for receiving a cylindrical member attached to said boat, said clamp further including a first member and a second member for positioning around said cylindrical member thereby securing said clamp to said boat, said support member integral with said base.

7. The apparatus of claim 1 further including an external connection in hydraulic communication with said first piston and said second piston, said external connection for introducing a hydraulic fluid, and said external connection having a removable plug independent of said first and second piston.

8. The apparatus of claim 1 wherein said base is a cylindrical base for mating with a tower section, said base coaxial with a mating portion of said tower section.

9. An accessory mounting apparatus for releaseably locking a boat accessory in a selected position, said apparatus comprising:
   a base for attaching to a boat, said base having a handle extending from said base, said handle having a first position and a second position;
   a ball head assembly having a ball held captive in a socket, said ball having a locked position and an unlocked position, with said handle in said first position said ball is in said unlocked position and movable within said socket, with said handle in said second position said ball is in said locked position and held in a fixed position, said socket having an opening through which a stud member extends from said ball, socket including a slot extending from said opening in said slot, said slot sized to receive said stud member, said stud member adapted to attach to an accessory;
   a support member connecting said ball head assembly to said base, said socket rotating about a longitudinal axis of said support member when said ball is in said unlocked position, said socket including a base member attached to a cap member, said base member having an inside ledge cooperating with a flange extending from said support member, said base member being held captive on said support member by said flange; and
   a first piston moved linearly by a spring actuated by said handle, said first piston hydraulically connected to a second piston in said support member, said second piston engaging a shoe adjacent said ball in said socket, and said shoe pressing against said ball in said locked position.

10. The apparatus of claim 9 wherein said handle is attached to a threaded shaft, said threaded shaft engaging a threaded portion of a first cylindrical opening, when said handle is rotated said threaded shaft causes said first piston to move linearly within a portion of said first cylindrical opening with a smooth bore.

11. The apparatus of claim 9 wherein said base is a clamp for a tubular member, said clamp including a through-opening for receiving a cylindrical member attached to said boat, said clamp further including a first member and a second member for positioning around said cylindrical member thereby securing said clamp to said boat, said support member integral with said base.

12. The apparatus of claim 9 wherein said base is a cylindrical base for mating with a tower section, said base coaxial with a mating portion of said tower section.

13. An accessory mounting apparatus for releaseably locking a boat accessory in a selected position, said apparatus comprising:
   a base adapted to be secured to a boat;
   a ball head assembly having a ball held captive in a socket, said socket having an opening through which a stud member extends from said ball, said socket including a slot extending from said opening in said slot, said slot sized to receive said stud member, said stud member adapted to attach to an accessory;
   a support member connecting said ball head assembly to said base;
   a handle movable between a first position and a second position, said handle extending from said base, said ball movable within said socket when said handle is in said first position, said socket rotating about a longitudinal axis of said support member when said handle is in said first position;
   a first piston sliding within a first conduit in said base, said first piston moving linearly in cooperation with said handle;
   a spring between said handle and said first piston, said spring partially compressed with said handle in said second position;
   a second conduit in said support member;
   a third conduit in fluid communication with said first conduit and said second conduit, said first, second, and third conduits containing an incompressible fluid;
   a second piston sliding within said second conduit, said second piston moving linearly in direct relation to a movement of said first piston; and
   a shoe in said socket, said shoe engaged by said second piston, said shoe having a concave spherical surface adjacent said ball, said shoe forced against said ball by said second piston when said handle is in said second position whereby said ball is locked in a selected position in said socket.

14. The apparatus of claim 13 wherein said socket includes a base member attached to a cap member, said base member having an inside ledge cooperating with a flange extending from said support member, said base member being held captive on said support member by said flange.

15. The apparatus of claim 13 wherein said base includes a through-opening for receiving a cylindrical member attached to said boat, said base further including a first member and a second member for positioning around said cylindrical member thereby securing said base to said boat.

16. The apparatus of claim 13 wherein said base is a cylindrical member for mating with a tower section, said support member integral with said base.

17. The apparatus of claim 13 wherein said handle is attached to a threaded shaft, said threaded shaft engaging a threaded portion of said first conduit, as said handle is rotated said threaded shaft causes said first piston to move linearly within a portion of said first conduit with a smooth bore.

18. The apparatus of claim 13 further including an external connection in hydraulic communication with one of said first, second, and third conduits, said external connection for introducing said incompressible fluid, and said external connection having a removable plug independent of said first and second piston configured to receive said incompressible fluid.

19. The apparatus of claim 13 wherein said first piston includes a cooperating o-ring engaging a circumferential groove in a cylindrical body of said first piston and said second piston includes a cooperating o-ring engaging a circumferential groove in a cylindrical body of said second piston.

* * * * *